May 23, 1961 C. E. PARKER 2,984,838
APPARATUS FOR HANDLING RIGID ELONGATED ARTICLES
Filed March 25, 1958 6 Sheets-Sheet 1

May 23, 1961  C. E. PARKER  2,984,838
APPARATUS FOR HANDLING RIGID ELONGATED ARTICLES
Filed March 25, 1958  6 Sheets-Sheet 2

May 23, 1961 C. E. PARKER 2,984,838
APPARATUS FOR HANDLING RIGID ELONGATED ARTICLES
Filed March 25, 1958 6 Sheets-Sheet 4

May 23, 1961 C. E. PARKER 2,984,838
APPARATUS FOR HANDLING RIGID ELONGATED ARTICLES
Filed March 25, 1958 6 Sheets-Sheet 5

FIG. 9

# United States Patent Office 2,984,838
Patented May 23, 1961

2,984,838

APPARATUS FOR HANDLING RIGID ELONGATED ARTICLES

Clarence E. Parker, deceased, late of Painesville, Ohio, by Frieda Parker, executrix, Painesville, Ohio, assignor to The Coe Manufacturing Company, Painesville, Ohio, a corporation of Ohio Filed Mar. 25, 1958, Ser. No. 723,895

1 Claim. (Cl. 1—144)

The present invention relates to apparatus for handling rectangular articles and more particularly to stacking articles such as wallboards, plaster laths, etc. or bundles thereof.

One of the principal objects of the invention is the provision of novel and improved material handling apparatus which will receive rigid rectangular articles fed thereto by a conveyor and arrange them for subsequent handling in stacks of two or more side-by-side piles with web material interposed between one or more layers, and which will be relatively simple in construction, inexpensive to manufacture, and reliable in operation.

The invention resides in certain constructions and combinations and arrangements of parts and further objects and advantages thereof will be apparent to those skilled in the art to which it relates from the following description of the preferred embodiment described with reference to the accompanying drawings, forming a part of this specification, in which similar reference characters designate corresponding parts, and in which:

Although it is to be understood that the invention may be otherwise embodied, it is herein shown and described as embodied in an apparatus for stacking uniform size bundles of plaster laths in three side-by-side piles keyed together by strips of paper inserted between a plurality of the layers of the stack and extending from one pile to the next. The construction provides a stable stack which can be easily handled as a unit but one which can, nevertheless, be easily separated into its separate piles, if desired.

Figures 1, 5:
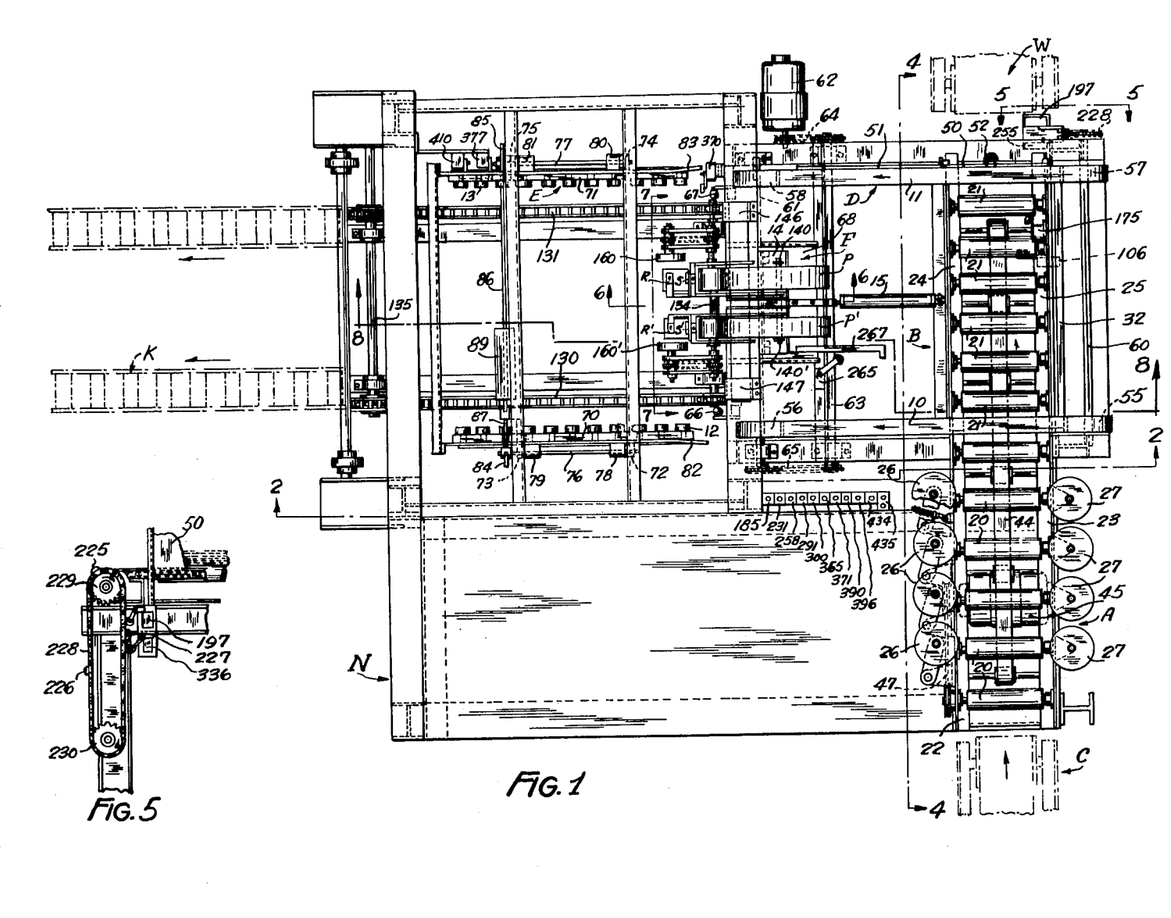
Fig. 1 is a plan view of a material handling apparatus embodying the present invention.
Fig. 5 is a fragmentary rear elevational view taken approximately on the line 5—5 of Fig. 1.

Generally speaking, the apparatus shown comprises two aligned driven roll-type conveyor sections A and B located adjacent to the right-hand end of the apparatus as viewed in Fig. 1 which conveyor sections are adapted to receive articles to be stacked, such as bundles of plaster laths, shown in dot-dash lines in some of the figures in some of the drawings and designated L, delivered to the apparatus in tandem relationship from a feed conveyor C. The length of the conveyor section B is approximately equal to that of a bundle of laths and as the leading end of each bundle reaches the far end of the conveyor section, the section drops a short distance to transfer the bundle on a cross conveyor D in the form of two belts 10, 11 which are intermittently driven in timed relation to the lowering of the conveyor section B. The cross conveyor D moves successive bundles transferred thereto toward the left a sufficient distance to clear the conveyor section B; that is, to a position at the left of the conveyor section B, as viewed in Fig. 1, where they will not interfere with the succeeding bundle fed to the conveyor section B.

As bundles of laths arrive on the conveyor section B, they are transferred to the cross conveyor D which is intermittently operated until it has received three bundles positioned thereon in side-by-side relationship. The conveyor D is then driven to transfer the bundles to a horizontal conveyor means E comprising two horizontally spaced rows of caster-like wheels 12, 13 adapted to engage underneath opposite ends of the bundles as they are fed thereto. The caster-like wheels are not driven and the bundles are pushed thereon by the belts of conveyor D in so far as they are capable of performing this operation. The bundles are thereafter moved to their final position on the conveyor means E by a mechanism F comprising what may be referred to as a disappearing pusher 14 actuated by a fluid pressure motor 15 in timed relation to the other operations of the apparatus.

The caster-like wheels of the conveyor means E are subsequently withdrawn from underneath the ends of the bundles thereon and the bundles permitted to drop onto a vertical or stacking conveyor or elevator G which, in turn, is periodically lowered in steps as bundles are positioned thereon. The stack thus formed in the vertical conveyor G may be removed in any convenient manner as by a discharge conveyor H and a gravity conveyor K of any suitable construction.

As the layers of bundles of laths are transferred from the cross conveyor D to the horizontal conveyor E one or more strips of web-like material may be placed upon each layer or any desired layers to tie the side by side piles of bundles in the stack being formed together to better facilitate subsequent handling. In the apparatus shown this is accomplished by web or paper feeding mechanism designated M. The various parts or mechanisms referred to are supported in a frame N constructed of suitable structural shapes welded or otherwise connected together, but the particular construction shown forms no part of the present invention and only those parts which are necessary to an understanding of the invention will be hereinafter referred to.

The conveyor sections A and B each comprise a series of five horizontal rolls 20, 21 respectively, supported in suitable bearing brackets projecting upwardly from vertical webs of pairs of angle irons 22, 23 and 24, 25, respectively. The angle irons 22, 23 are fixedly secured to the upper part of the frame N and in addition to the horizontal rolls 20, support two series of edge or side rolls adjacent to opposite ends of the rolls 20. Each series of edge rolls comprises four rolls 26, 27, respectively. The rolls 27 are located adjacent to the right-hand ends of the rolls 20 and are rotatably supported about fixed vertical axes; whereas, the rolls 26 which are at or adjacent to the other ends of the rolls 20, are yieldably supported for movement toward and from the adjoining ends of the rolls 20. The construction is such that the rolls 26 align any bundles passing through the conveyor section A with the rolls 27 and in turn the length of the conveyor section, if they are not perfectly aligned therewith.

Opposite ends of the angle irons 24, 25 which carry the rolls 21 of the conveyor section B are connected to and supported by the upper ends of pairs of bell crank levers 30, 31, one pair being located adjacent and connected to opposite ends of the angle irons 24, 25. The bell crank levers are pivotally connected to cross members 32, 33 of the frame and are normally held in position to maintain the rolls 21 about the level of the belts 10, 11 of the cross conveyor D by a double acting fluid pressure operated motor 34 pivotally supported to a cross member of the frame, the piston of which motor is connected by a rod 35 to the upper end of a lever 36 connected to a shaft 37 pivotally supported in the frame and extending lengthwise of the conveyor section B. Opposite ends of the shaft are provided with levers 40, 41 which levers are in turn connected by links 42, 43 to the respective bell crank levers 30, 31. When the fluid pressure motor 34 is reversed, the angle irons 24, 25 and in turn the rolls 21 are moved or dropped to a position below the upper reaches of the belts 10, 11 of the cross conveyor D with the result that a bundle on the conveyor section B is transferred to the cross conveyor D. The holes in the brackets connected to the angle irons 24, 25 through which the pivot pins project which connect the bell crank levers 30, 31 to the angle iron 24, 25 are elongated horizontally thereby permitting oscillation of the angle irons.

The rolls 20, 21 of the conveyor sections A and B are driven at uniform speed by a continuous belt 44 looped about suitable pulleys carried by the angle irons 22, 23 and 24, 25, some of which pulleys are interspersed between the rolls 20, 21 in such a manner that the outside of the belt 44 engages the underside of all of the rolls 20, 21. The belt is driven from an electric motor 45 through a speed reducer 46 and a flexible drive designated generally as 47. The rolls of the conveyor sections A and B are driven at approximately three times the speed of the feed conveyor section C with the result that bundles fed to the conveyor section B are separated a minimum distance irrespective of whether or not they are spaced with respect to one another on the conveyor C. This permits a leading bundle to be transferred by the cross conveyor D and to be moved thereby to one side of the conveyor section B before the next succeeding bundle is fed to the conveyor section B.

The rolls 21 in the embodiment shown are continuously driven and bundles of laths fed thereto are prevented from overrunning the conveyor section B by a bumper or gate bar 50 extending along the discharge end of the conveyor section B and in line with a similar bar 51 along the far side of the cross conveyor D. The bumper bar 50 is slidably supported in the frame for vertical movement to and from a position in front of a bundle of laths moving forwardly on the conveyor section B. The bumper bar 50 is connected to the piston rod of a double acting fluid pressure motor 52 adapted to normally maintain the bumper bar in the position shown; that is, in position to be engaged by the leading end of a bundle of laths on the conveyor section B but operable to lower the bar to a position beneath the line of travel of the bundles. If for some reason the operator of the apparatus does not desire a particular bundle to be transferred from the conveyor section B to the cross conveyor D and in turn the stack being formed in the vertical conveyor G, he presses a push button switch, hereinafter referred to, to actuate the motor 52 to lower the bumper bar 50 into its down position. In this event bundles of laths on the conveyor section B continue on in a straight line to an auxiliary conveyor W.

Figure 2:
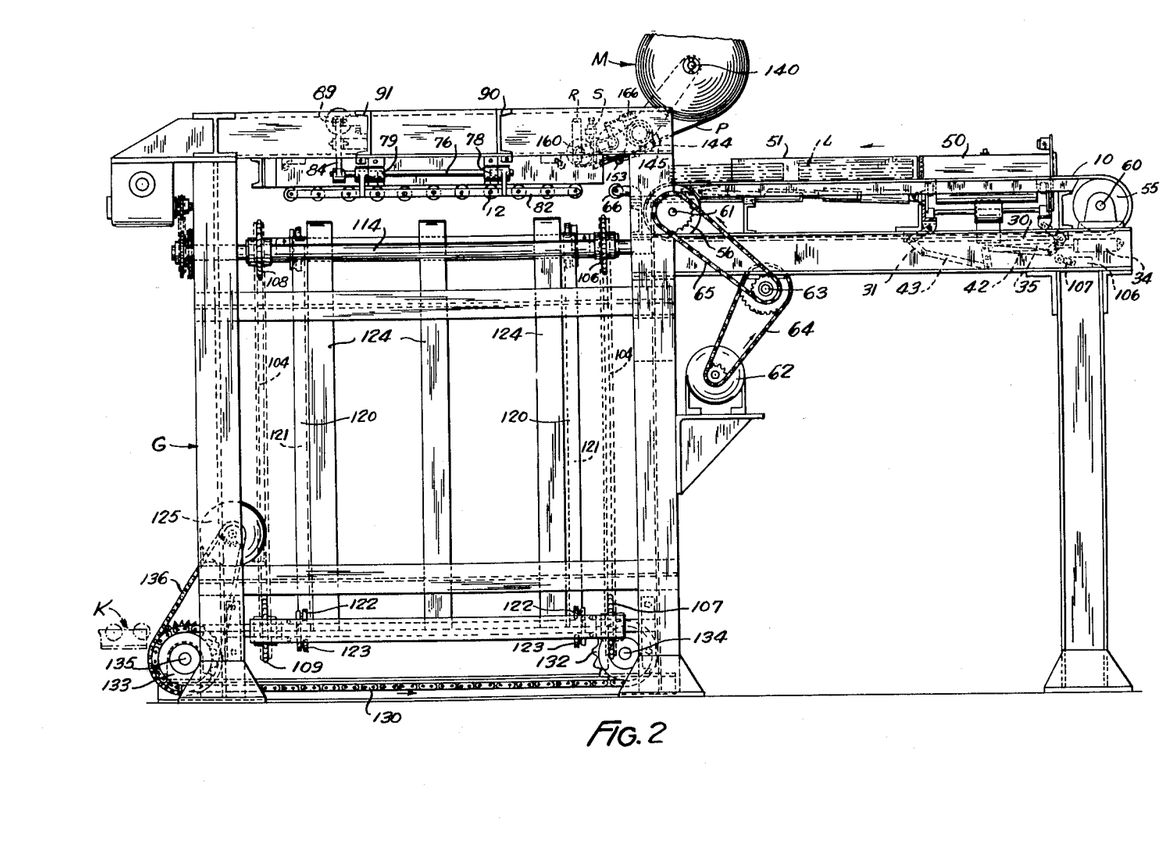
Fig. 2 is a sectional view taken approximately on line 2—2 of Fig. 1.

The belts 10 and 11 of the cross conveyor D are reeved about suitable pairs of pulleys 55, 56 and 57, 58 carried by shafts 60, 61 rotatably supported in the frame at opposite ends of the cross conveyor. The shaft 61 and in turn the belts 10 and 11 are intermittently operated from an electric motor 62 connected to a shaft 63 by a sprocket chain drive 64. The shaft 63 is in turn connected to the shaft 61 by a sprocket chain drive 65. As the first two bundles of laths are successively dropped on to the cross conveyor D, the motor 62 is operated, in a manner hereinafter more fully described, to move the bundle just transferred to the cross conveyor just far enough to clear the conveyor B for the following bundles. As the third bundle of laths is transferred from the conveyor B to the cross conveyor D the motor 62 is operated to transfer the three bundles of laths thereon to the horizontal conveyor means E or more specifically to the series of wheels 12, 13 of the conveyor means E. The gap intermediate the left-hand ends of the belts 10, 11, as viewed in Figs. 1 and 2, and the right-hand wheels of horizontal conveyor means E is spanned in part by a pair of wheels 66, 67 rotatably supported in the upper ends of brackets suitably connected to the frame. As previously stated, the wheels 12, 13 are not driven and it will be apparent that actuation of the belts 10, 11 will not fully transfer the last bundle onto the horizontal conveyor means E. The leading bundles will be pushed along the horizontal conveyor means by the trailing bundles, but it is necessary to provide supplemental means for pushing the last bundle onto the horizontal conveyor means. In the present instance, this is accomplished by the disappearing pusher 14 forming a part of the mechanism F previously referred to. The pusher 14 is in the form of a generally horizontal plate, the left-hand end of which is pivotally connected to the leading or left-hand end of a slide member 68 supported in the frame for linear movement longitudinally of the travel of the cross conveyor. The double acting fluid pressure actuated motor 15, previously referred to, has its piston rod pivotally connected to the rear or right-hand side of the pusher 14 at a point slightly above the axis of its connection with the slide member 68 and approximately midway between the upper and lower edges of the pusher. The construction is such that as the fluid pressure motor 15 is actuated to extend its piston rod, the pusher 14 first pivots about its connection with the member 68 to engage the right-hand or rear side of the trailing bundle on the cross conveyor. Continued operation of the motor 15 slides the member 68 with the pusher 14 in a forwardly direction a sufficient distance to properly locate the bundles of laths in the horizontal conveyor means E.

Figure 3:
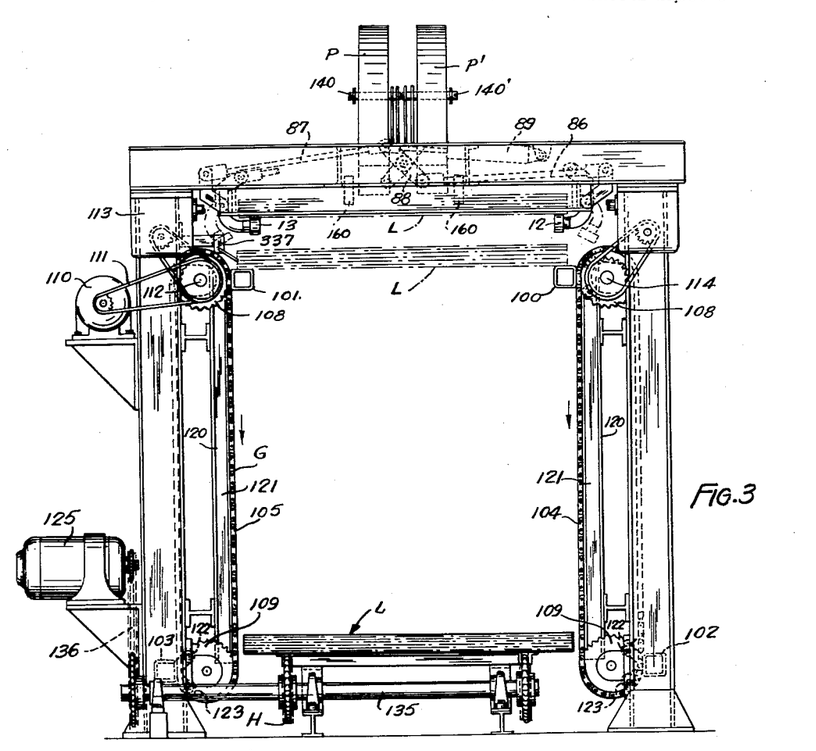
Fig. 3 is a left end elevational view of the apparatus as shown in Fig. 1.
Figure 4:
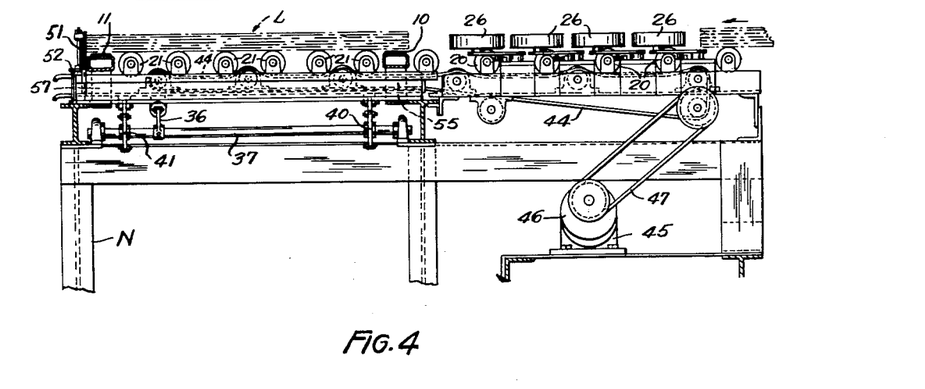
Fig. 4 is a sectional view taken approximately on line 4—4 of Fig. 1.

The wheels 12, 13 of the horizontal conveyor means E are rotatably connected to rectangular rod-like members 70, 71, respectively, extending lengthwise along opposite sides of the conveyor means E. The members 70, 71 are connected by brackets 72, 73 and 74, 75 to rods 76, 77 pivotally connected by brackets 78, 79 and 80, 81 to respective side plates 82, 83 of the frame N. The rods 76, 77 are operatively connected by levers 84, 85 and links 86, 87 to opposite ends of a lever 88 pivotally connected intermediate its ends to the frame N. The upper end of the lever 88 as viewed in Fig. 3 is connected to the piston rod of a double acting fluid pressure motor 89, also supported in the frame N. Operation of the motor 89 in opposite directions moves the wheels 12 and 13 into and out of a position underneath opposite ends of a layer of bundles of laths transferred to the conveyor means E; that is, between the full line and dot-dash line positions shown in Fig. 3. When in the dot-dash line positions, the wheels 12, 13 are clear of the ends of bundles in the conveyor F.

The frame side plates 82, 83 of the horizontal conveyor means E previously referred to, are welded to the lower edges of the cross members 90, 91 forming a part of the frame N. When the wheels 12, 13 are withdrawn from underneath the ends of the bundles forming the layer in the horizontal conveyor, the bundles will be dropped onto the vertical conveyor or elevator G or the stack of bundles therein with their lengths running crosswise of the direction of travel of the cross conveyor. When the first layer of bundles of laths in any particular stack being formed in the vertical or stacking conveyor G is dumped by the horizontal conveyor means E upon withdrawal of the wheels 12, 13 from underneath opposite ends of the respective bundles in the layer, the bundles drop upon one pair 100, 101 of two pairs of tubular elevator or load bars 100, 101 and 102, 103 of rectangular cross section located underneath the wheels 12, 13. One bar of each pair is located at opposite sides of the vertical conveyor G. The load bars are connected to and carried by pairs of sprocket chains 104, 104 and 105, 105 located at opposite sides of the conveyor G. The pairs of sprocket chains are reeved about suitable pairs of sprocket wheels 106, 107 and 108, 109 at opposite sides of the conveyor. The sprocket chains are adapted to be intermittently operated to drop the members 100, 101 in steps as the layers of bundles are placed thereon or on the partial stack thereabove by an electric hoist motor 110 connected by a drive 111 to the shaft 112 which carries the upper sprocket wheels for the left-hand pair of sprocket chains 105, as viewed in Fig. 3. A cross drive designated generally by the reference character 113 connects the upper shaft 112 at the left-hand side of the conveyor, as view in Fig. 3, with the upper shaft 114 at the right-hand side of the conveyor. The shaft 114 carries the upper pair of sprocket wheels 106, 108 for the pair of sprocket chains 104.

The distance that the pair of load bars 100, 101 drops upon each actuation of the motor 110 is approximately equal to the thickness of a layer of bundles. By this arrangement, the top of the stack being formed in the vertical conveyor G is always maintained only a slight distance below the horizontal conveyor means E with the result that the successive layers of bundles fed to the stack merely drop a short distance as they are transferred from the horizontal conveyor means E to the stack being formed in the vertical conveyor G.

In their travel from a position adjacent to the upper sprocket wheels to the lower sprocket wheels the load bars facing towards each other are prevented from tilting and spreading, or moving outwardly with respect to the stack of bundles being formed, by structural members 120 forming a part of the frame and having grooves or tracks 121 therein, within which pairs of vertically spaced wheels or rollers 122, 123 connected to the load bars travel. Vertically extending wooden strips 124 located intermediate the respective sprocket chains with the edges of the strips facing one another, being in line with the inner reaches of the chains, assist in guiding the stack in its vertical movement.

When the bottom of the stack of bundles being formed in the vertical conveyor G reaches the bottom of the conveyor, the stack is transferred by the discharge conveyor H driven by an electric motor 125 which conveyor transfers the stack to the gravity conveyor K and in turn a desired location. Other means, for example, a fork type lift truck, may be employed to remove the stack of bundles from the vertical conveyor G.

In the embodiment of the invention shown, the motor 110 is always operated in the same direction and each pair of sprocket chains 104, 105 carries one of the load bars of each pair connected thereto so that when one pair of bars reaches the bottom of the vertical conveyor and transfers the stack formed thereon to the conveyor H, the second pair of bars is in position to receive the first layer of bundles of the succeeding stack.

The conveyor H comprises a pair of sprocket chains 130, 131 each of which is reeved about a pair of sprocket wheels 132, 133 connected to transversely extending shafts 134, 135 the latter of which is connected by a sprocket chain drive 136 to the electric motor 125. The upper reaches of the sprocket chains 130, 131 are supported to prevent sagging by the load thereon by channel members connected to the frame of the apparatus.

According to the provisions of the present invention web-like material such as paper is inserted between two or more layers of bundles of laths in the stack formed. This stabilizes the vertical piles of bundles relative to each other during subsequent handling of the stack but allows the piles to be readily separated from one another, as desired.

In the embodiment shown two strips of paper P, P' are placed upon one or more layers of bundles as they are being transferred from the cross conveyor D to the horizontal conveyor E of the stacker proper. The respective ends of the strips of paper are preferably connected, as by being cemented or stapled, to the end bundles of laths for the purpose of holding the strips in position until the next layer of laths is placed on top of them. Since the two mechanisms for applying the strips of paper P, P' are alike only the one employed to apply the strip P will be described in detail. The corresponding parts of the other mechanism will be designated by the same reference characters with a prime mark applied thereto. It is also to be understood that, if desired, merely one strip may be used in which event one mechanism may be dispensed with.

Figure 6:
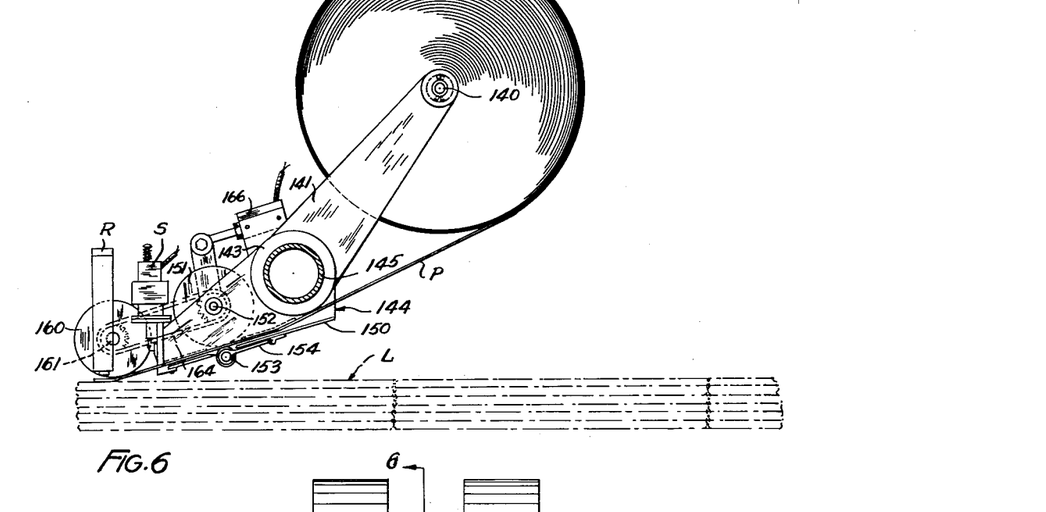
Figs. 6 and 7 are enlarged fragmentary views approximately on the lines 6—6 and 7—7 of Fig. 1, also on line 6—6 of Fig. 7.
Figure 7:
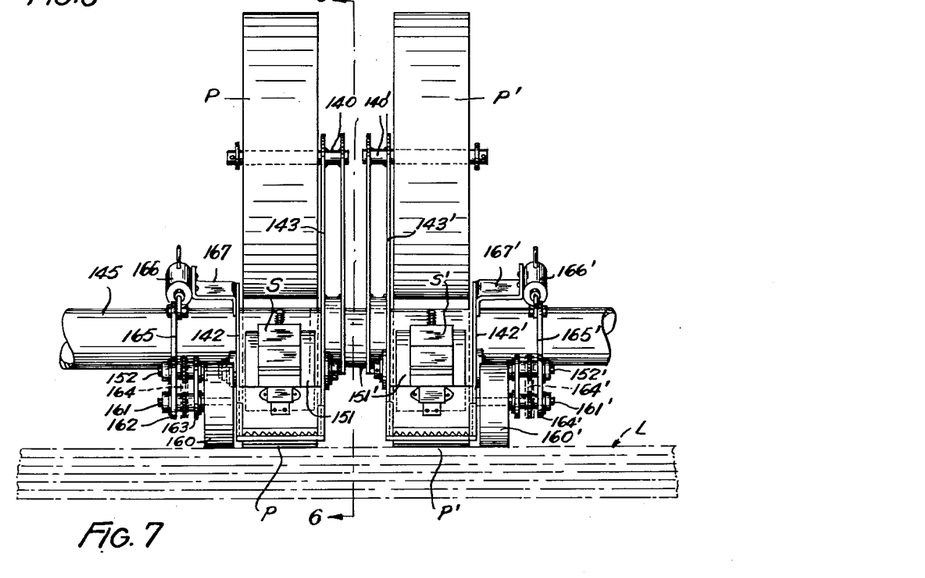
Figure 8:
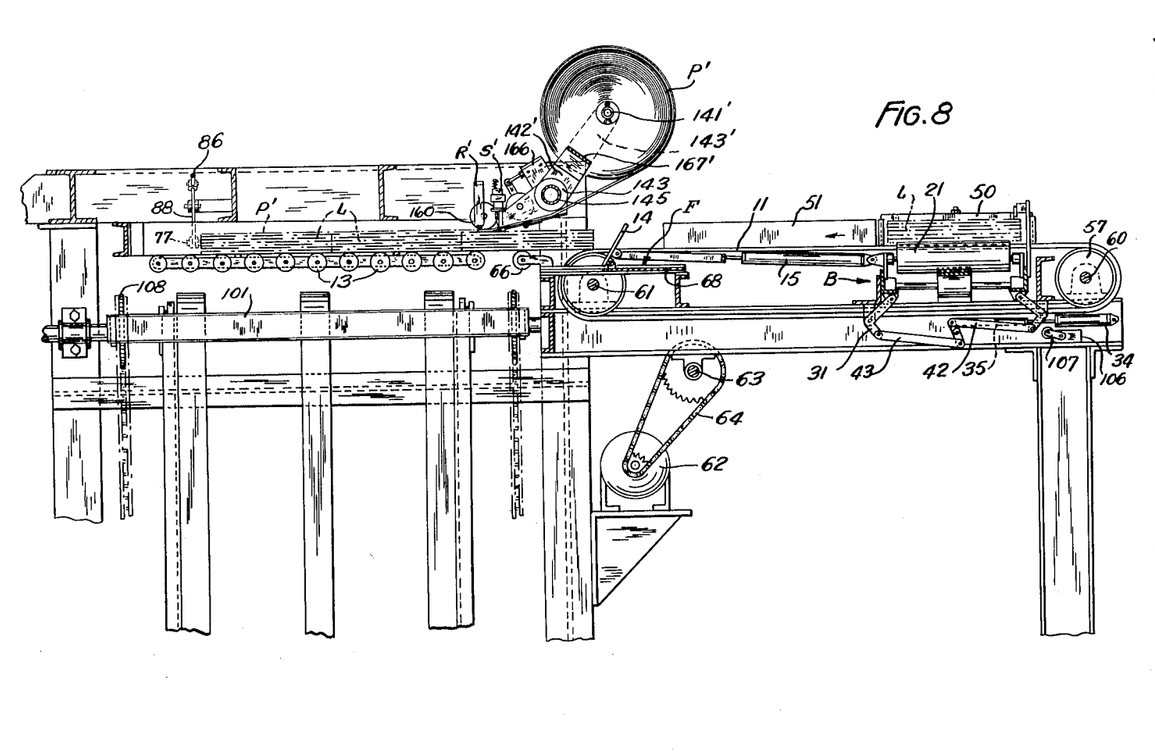
Fig. 8 is a fragmentary enlarged sectional view taken approximately on the line 8—8 of Fig. 1.
Figure 9:
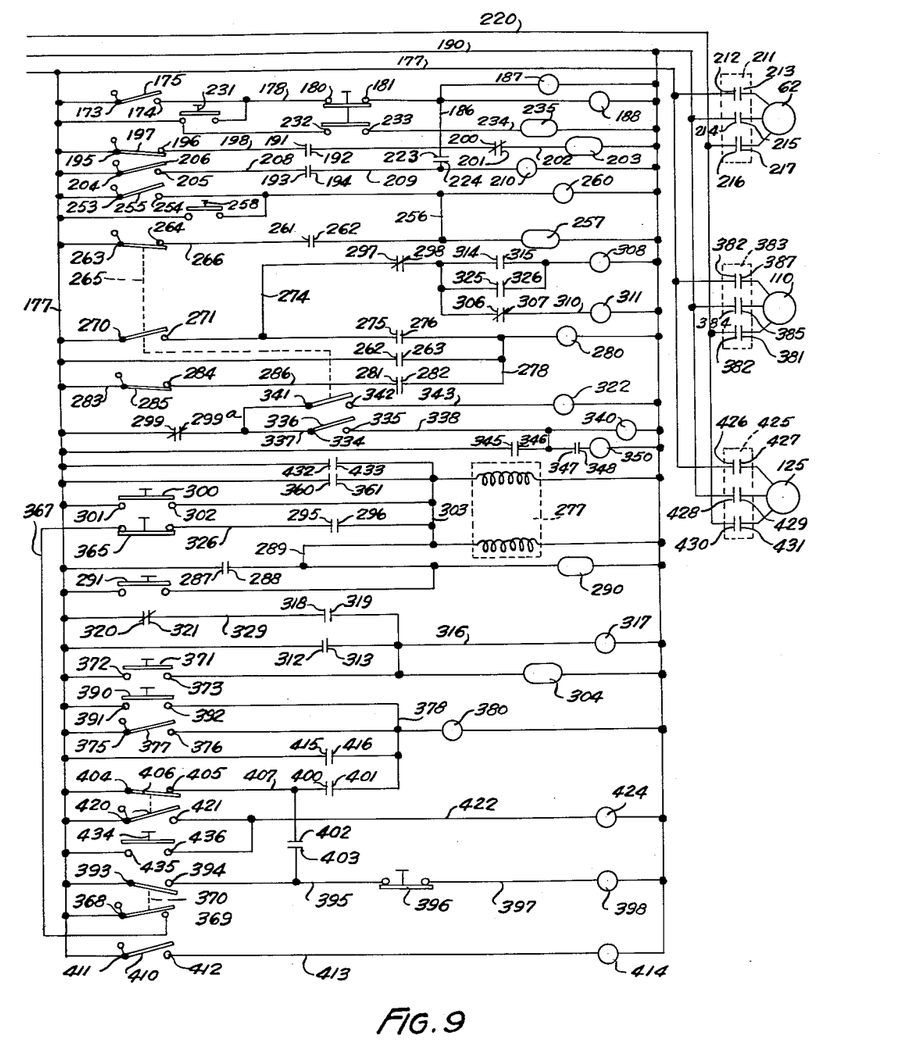
Fig. 9 is a schematic diagram showing the controls incorporated in the apparatus.

Referring particularly to Figs. 6 and 7 the paper P is in the form of a roll supported on a shaft or spindle 140 carried by an arm 141 forming a part of one of two side plates 142, 143 of a bracket designated generally as 144 and adjustably fixed to a stationary tubular shaft 145 connected to the frame N by brackets 146, 147. The side plates 142, 143 of the bracket 144 are connected by a bottom plate 150 over which the strip of paper P is adapted to be fed by a feed wheel 151. The feed wheel 151 is fixed to a shaft 152 journaled in the side plates 142, 143 and the paper is fed therebetween and an idler roller or wheel 153 located below the feed wheel in a cut out section of the bottom plate 150 of the bracket 144 and spring biased towards the lower edge of the feed wheel. The wheel 153 is carried by a member 154 connected to the bottom plate 150 of the bracket 144. The feed wheel 151 is driven by or from a wheel 160 adapted to engage the top sides of bundles of laths just as or shortly after they enter the horizontal conveyor E. The wheel 160 is fixed to a shaft 161 journaled to two parallel links 162, 163 which links have their other ends pivoted to the shaft 152 which carries the feed wheel 151. A sprocket chain drive designated generally as 164 provides the required drive between the shafts 152, 161. In the embodiment shown the weight of the wheel 160 keeps it in driving contact with the top sides of the bundles of laths passing underneath it but it may be otherwise biased toward the bundles, if desired.

The link 162 has an upwardly projected arm 165 formed integral therewith the free end of which is connected to the piston rod of a single acting reciprocating type pressure fluid motor 166 the cylinder of which is pivoted to a projection or member 167 welded to the shaft 145. The motor 166 is employed for the purpose of lifting the roller 160 above the path of travel of bundles of laths when no paper is to be inserted above the particular layer or layers being fed to the stack. The stroke of the motor 166 limits the downward or counterclockwise movement of the wheel 160 when the motor 166 is de-energized and no bundle is underneath the wheel. The flow of pressure fluid to and from the motor 166 is controlled in a manner hereinafter referred to by a solenoid operated valve.

For the purpose of cutting the strip of paper as desired and for securing the ends thereof to the leading and trailing bundles of laths of each layer fed to the horizontal conveyor E the bracket 144 carries solenoid operated stapling and cut-off heads R and S, respectively. These heads are of commercial construction and are not herein described. Suffice it to say that at predetermined intervals, as will be hereinafter described, the heads are operated to first staple the leading end of the strip P which has been fed to a position underneath the stapling head by the wheel 160, etc. to the top side of the leading bundle of laths in the layer in the process of being fed to the horizontal conveyor and thereafter cut the strip and staple the other or trailing end to the top side of the trailing bundle of laths in the layer.

Operation

As the leading end of a bundle of laths on the conveyor section B approaches the bumper bar 50, it closes normally open contacts 173, 174 of a switch 175 fixed to the frame and having a control member projecting into the path of travel of the bundles. The closing of the switch 175 establishes a circuit from a control power line 177 through the non-closed contacts 173, 174 of switch 175, a wire 178, normally closed contacts 180, 181 of a manually operable reject switch 185, wire 186, time delay relay 187, and a control relay 188 in parallel circuit with the time delay relay 187 to the other control power line 190. Energization of the control relay 188 closes its normally opened contacts 191, 192 and 193, 194. The closing of the contacts 191, 192 establishes a circuit from the line 177 through normally closed contacts 195, 196 of a switch 197, wire 198, now closed contacts 191, 192, wire 186, normally closed contacts 200, 201 of time delay relay 187 which contacts are now closed since the relay is of the delayed opening type, wire 202 and solenoid valve 203 which controls the direction of flow of pressure fluid to and from the motor 34, to line 190. Operation of the motor 34 drops the rolls 21 of the conveyor section B to their down position thus transferring the bundle of laths thereon to the belts 10, 11 of the cross conveyor D.

As the conveyor section B drops, it closes normally open contacts 204, 205 of switch 206 fixed to the frame and having an operating member 207 projecting in the path of one of the rocker arms or bell crank levers 30. The closing of contacts 204, 205 of switch 206 establishes a circuit from the control line 177 through the now closed contacts 204, 205 of switch 206, wire 208, now closed contacts 193, 194 of control relay 188, wire 209, operating solenoid 210 of motor controller 211 for the cross conveyor motor 62. Energization of the solenoid 210 closes the normally open contacts 212, 213 and 214, 215 and 216, 217 of motor controller 211 connecting the motor 62 to the power lines 177, 192, 220 causing the motor to operate in a direction to move the bundle or bundles of laths thereon toward the left as viewed in Figs. 1 and 2. Simultaneously with the energization of the motor 62, a normally open pair of holding contacts 223, 224 on the motor controller 211 is closed establishing a holding circuit for the solenoid 210 from the line 177 through switch 197, wire 198, relay contacts 191, 192, wire 186, contacts 223, 224, and wire 209 which maintains the motor 62 operating and the solenoid 203 which controls the motor 34 energized, subsequent to the movement of the bundle of laths away from the actuation of the switches 175 and 206 respectively.

The switch 197 is located adjacent to the rear right-hand end of the cross conveyor D as the apparatus is viewed in Fig. 1 and after a predetermined travel of the conveyor belts 10, 11, the switch is opened by the first of three trips 225, 226, 227 upon a sprocket type timing chain 228 connected to a sprocket wheel 229 fixed to the rear end of the shaft 60 and to an idler sprocket 230 fixed to the frame of the apparatus. The trip 225 is adjustably connected to the timing chain 228 and is set to open the switch 197 after the belts 10, 11 have moved sufficiently to carry a bundle of laths transferred thereto from the conveyor section B to the left-hand side of the conveyor section and into a position where it will not interfere with a succeeding bundle of laths moving onto the conveyor section B. After a predetermined time interval, the contacts 200, 201 of the time delay relay 187 open thus breaking the circuit to the solenoid valve 203 which controls the motor 34 thereby causing the motor to reverse and the conveyor section B to return to its up position, if this has not already occurred by the prior opening of the switch 197 as will be the case except upon each third operation of the motor 34.

The cycle of operation just referred to can be initiated at the will of an operator by the mere depressing of a push-button switch 231 located at a control station at the near side of the apparatus as viewed in Fig. 1. The switch 231 is in parallel circuit with the switch 175 between the control power line 177 and the wire 178. The operator may also prevent automatic operation of the cycle referred to and cause the bumper bar 50 to be moved below the line of travel of a bundle of laths on the conveyor section B by depressing the reject push-button switch 185 previously referred to, which switch is also located at the control station. In addition to the normally closed set of contacts 180, 181 previously referred to, the reset button 185 contains a pair of normally open contacts 232, 233 which when closed by the depressing of the switch actuator establishes a circuit from the control power line 177 through wire 234 and solenoid valve 235 which controls the flow of fluid pressure to and from the motor 52 connected to the bar 50 to the line 190.

Upon each third actuation of the motor 62, the trip 227 which actuates the switch 197 is so positioned on the timing chain 228 that the motor continues to operate until the bundles of laths on the belts 10, 11 have been moved into the horizontal conveyor means E as far as the belts are capable of moving them. In this event the circuit to the solenoid valve 203 which controls the motor 34 had previously been opened by the time delay relay 187 so as to permit the conveyor section B to raise for the reception of an oncoming bundle of laths.

Simultaneously with the opening of the switch 197 which discontinues operation of the motor 62, normally open contacts 253, 254 of switch 255 are closed preferably by the same trip 227 which actuated the switch 197. The closing of the contacts 253, 254 of switch 255 establishes a circuit from the control power line 177 through wire 256 and solenoid valve 257 which reverses the direction of operation of the double acting fluid pressure motor 15 causing the motor to actuate the pusher to push the bundles of laths into their final position in the conveyor means E. Simultaneously with the energization of solenoid valve 257 for controlling the motor 15, a relay 260 is energized, the operating solenoid of which is in parallel circuit with the solenoid valve 257. Operation of the relay 260 closes its normally open contacts 261, 262 establishing a holding circuit through normally closed contacts 263, 264 of a switch 265 with which contacts they are connected by a wire 266. This holding circuit maintains the solenoid valve 257 energized subsequent to the opening of switch 255 until the pusher reaches the end of its stroke at which time a trip 267 connected to the pusher opens the normally closed contacts 263, 264 of switch 265, reversing the direction of operation of the motor 15. The pusher 14 may be operated by the operator at any desired time by a push-button switch 258 in parallel with the switch 255 between the line 177 and the wire 256.

Simultaneously with the opening of the contacts 263, 264 of switch 265 normally open contacts 270, 271 thereof are closed. The closing of these contacts establishes a circuit from line 177 through contacts 270, 271, wire 274, normally open but now closed contacts 275, 276, of a reset counter 277, wire 278, and time delay relay 280 to line 190. The closing of contacts 270, 271 of switch 275 at the end of the pusher stroke is merely instantaneous and a holding circuit for relay 280 is established by the closing of the instantaneous close contacts 281, 282 of time delay relay 280 which establishes a circuit from the line 177 through normally closed contacts 283, 284 of switch 285, wire 286, and contacts 281, 282 to wire 278 and in turn the time delay relay. After a predetermined time delay, the delayed closing contacts 287, 288 of time delay relay 280 close, establishing a circuit from the line 177 through wire 289 and solenoid valve 290 which controls the operation of the motor 89 causing the wheels 12, 13 of the conveyor mechanism E to be withdrawn from underneath the ends of bundles of laths thereon and the load thus supported, dumped or dropped either upon one of the pairs of elevator bars or upon the top of the stack of bundles in the vertical conveyor or elevator G. As the fluid pressure motor 89 reaches the end of its stroke, a trip thereon opens the switch 285 causing the motor to reverse and return the wheels 12, 13 of the conveyor mechanism E to their up position; that is, to the position in which they receive bundles of lathes from the cross conveyor D.

The dump motor 89 can be actuated at any time by the operator by the depressing of a push button switch 291 at the control station, which switch is in parallel circuit with the contacts 287, 288 of time delay relay 280 between the line 177 and the wire 289.

In the embodiment of the invention shown, the so-called counter or counting relay 277, previously mentioned, contains in addition to the contacts 275, 276 which are normally open, but are closed during the count, normally open reset contacts 295, 296 and normally closed contacts 297, 298 and 299, 299a. The counter is started at the beginning of the operation of the apparatus by the operator depressing the counter start push button switch 300 to close its normally open contacts 301, 302, the first of which is connected to the line 177 and the second to the counter by wire 303. This closes contacts 275, 276 and 295, 296 during the count and opens the normally closed contacts 297, 298 which are provided for the purpose of giving non-repeat impulses.

The counter 277 is inserted in the control in such a way that after each predetermined number of operations of the switch 265, the counter is counted out and upon the next closing of the normally open contacts 270, 271 of the switch 265, a circuit for a solenoid valve 304 which controls the actuation of the paper feed motor 166 is de-energized causing a strip or strips of paper to be applied to the next layer of bundles of laths fed to the horizontal conveyor E. As shown, an Eagle Microflex Reset Counter is employed. This counter is commercially available and is manufactured by Eagle Signal Corporation, Moline, Illinois. It is, however, to be understood that any suitable counter or counting relay may be employed.

The counter 277 is initially started, as previously stated, by the operator depressing the push button switch 300 to close its normally open contacts 301, 302. After a predetermined number of counts; that is, operations of the switch 265 and in turn the time delay relay 280, the then closed counter contacts 275, 276 and 295, 296 open and the then open contacts 297, 298 and 299, 299a close. Upon the next operation of the switch 265 and the closing of its normally open contacts 270, 271, a circuit is established from the power line 177 through contacts 270, 271 of switch 265, wire 274, now closed contacts 297, 298 of the counter 277, wire 305, normally closed contacts 306, 307 of relay 308, wire 310, and relay 311 to line 190. Energization of the relay 311 closes its normally open contacts 312, 313 and 314, 315. The closing of contacts 312, 313 of relay 311 establishes a circuit from the control power line 177 through the now closed contacts 312, 313 of relay 311, wire 316, and solenoid valve 304 to line 190. Energization of the solenoid valve 304 de-energizes the paper feed motor 166 allowing the roller 160 to drop into position to be engaged by the succeeding bundles of laths, fed onto the horizontal conveyor means E. Simultaneously with the energization of the solenoid valve 304, relay 317 in parallel circuit therewith is energized to close its normally open contacts 318, 319, establishing a holding circuit for the solenoid valve 304 from the line 177 through normally closed contacts 320, 321 of relay 322, wire 323, contacts 318, 319, wire 316 and relay 317 to line 190. This holding circuit is necessary to maintain the motor 166 de-energized and the roller 160 down until the paper has been fed and the leading end of the strip fixed to the leading bundle of laths therebelow because simultaneously with the closing of the normally open contacts 312, 313 of relay 311, the normally open contacts 314, 315 thereof close establishing a circuit for relay 308 from the wire 305 through the contacts 314, 315, wire 324 and relay 308 to line 190. Energization of relay 308 opens the normally closed contacts 306, 307 previously referred to and which contacts are in series circuit with relay 311. Energization of relay 308 also closes the normally open contacts 325, 326 in parallel circuit with contacts 314, 315 of relay 311 thus establishing a holding circuit for relay 308.

As the bundles of laths move into the horizontal conveyor E the trip 226 on the timing chain 228 closes normally open contacts 334, 335 of switch 336 establishing a circuit from the line 177 through the now closed contacts 299, 299a of the counter 277, wire 337, now closed contacts 334, 335 of switch 336, wire 338 and operating solenoid 340 of stapler R to line 190. Energization of solenoid 340 causes the stapler R to staple the leading end of the strip P to the leading bundle of laths being fed into the horizontal conveyor E. The switch 336 is located below switch 197 thus providing an interval between the time switches 197, 336 operate. During this interval the leading edge of the leading bundle of laths being fed to the conveyor has moved under the stapler head R. Simultaneously with the closing of normally open contacts 270, 271 of switch 265 a second pair of normally open contacts 341, 342 close. Because the counter 277 is counted out this establishes a circuit from the line 177 through contacts 299, 299a, wire 337, contacts 341, 342, wire 343 and relay 322 to line 190. Energization of relay 322 closes its normally open contacts 345, 346 and 347, 348 energizing operating solenoid 340 for stapler R and operating solenoid 350 for the cut-off head S in parallel therewith. This cuts the paper and staples the trailing end of the severed strip to the top side of the trailing bundle laths. Operation of relay 322 also opens its normally closed contacts 320, 321 causing the motor 160 to again lift the roll 160 clear of the bundles of laths.

Relay 322 is also provided with a third and fourth pair of normally open contacts 360, 361 and 262, 263. The closing of these contacts 360, 361 which are in parallel circuit with the counter start push-button switch 300 between the line 177 and the wire 303, starts the counter. The simultaneous closing of the contacts 362, 363 of relay 322 establishes a circuit from the line 177 through the wire 278 for the time delay relay 280 to line 190. Energization of the time delay relay 280 closes its instant closed contacts 281, 282 to establish a holding circuit therefor from the line 177 through normally closed contacts 283, 284 of switch 285 and wires 286, 288 to line 190. Upon the closing of the delay closed contacts 287, 288 of time delay relay 280, solenoid valve 290 is energized in a manner previously described to actuate fluid pressure motor 89 causing the same to drop the load on the horizontal conveyor E onto the stack in the vertical conveyor G.

Simultaneously with the energization of the solenoid valve 290 which caused the fluid pressure motor 89 to drop the load from the horizontal conveyor E to the vertical conveyor G, the stepping relay 277 was actuated to step the relay and to again close the contacts 275, 276 thereof in preparation for the oncoming bundles of laths and open the then closed contacts 297, 298 and 299, 299a. The opening of contacts 297, 298 breaks the holding circuit for relay 308 allowing its contacts 325, 326 to open and its contacts 306, 307 to close. Then the counter 277 reached the predetermined count, the opening of contacts 295, 296 caused the counter to reset. The contacts 295, 297 are in series circuit with a manual push button switch 365 through wire 366, by which the counter may be reset at any desired interval. The reset push button switch 365 is also in series circuit through wire 367 with a normally closed set of contacts 368, 369 of a switch 370 hereinafter again referred to.

The solenoid valve 304 can be manually operated as desired to feed the paper P by the operator depressing a push button switch 371 located at the control station, to close its normally open contacts 372, 373, establishing a circuit from line 177 through contacts 372, 373 of switch 371, wire 316, and solenoid valve 304 to line 190.

As the load or bundles of laths on the horizontal conveyor E are dropped onto the load bars of the vertical conveyor G, or the top of the stack in the vertical conveyors as the case may be, they close the normally open contacts 375, 376 of switch 377, establishig a circuit from the line 177 through the switch 377, wire 378 and operating solenoid 380 of motor controller 381 to line 190. Energization of the operating solenoid 380 of the motor controler 381 closes the normally open contacts 382 and 383, 384 and 385, 386 and 387 of motor controller 381 which connects the elevator motor 110 to the power lines 177, 190, 220 in such a manner that the motor operates in a direction to lower the bundles of laths in the vertical conveyor. As the bundles of laths move away from the actuator for the switch 377, the switch opens stopping the elevator motor 110. The elevator motor may be moved at any time by the operator by depressing a push button switch 390 located at the operator's position, to close contacts 391, 392 which are in series circuit with the switch 377.

The operation of dropping successive layers of bundles of laths upon the elevator or vertical conveyor G continues until the stack in the elevator G has reached a predetermined height at which time the switch 370 is actuated to open its closed contacts 368, 369 and close its open contacts 393, 394. The opening of contacts 368, 369 opens the reset circuit for the counter 277 causing the counter to reset in preparation for the following stack to be formed in the vertical conveyor or elevator G. The closing of contacts 393, 394 establishes a circuit from the line 177 through the contacts 393, 394 which are now closed, wire 395, and elevator motor stop switch 396 which is normally closed, wire 397, and relay 398 to line 190. Operation of relay 398 closes the normally open contacts 400, 401 and 402, 403. The closing of contacts 400, 401 establishes a circuit for the operating solenoid 380 of the motor controller 381 for the elevator motor 110 from the line 177 through the now closed contacts 404, 405 of switch 406, wire 407, contacts 400, 401 of relay 398, wire 378 and operating solenoid 380 to line 190. This either starts the elevator motor 110 or continues its operation in a direction to lower the stack of bundles of laths in the vertical conveyor. The closing of contacts 402, 403 of relay 398 establishes a holding circuit for the relay which will continue operation of the elevator motor 110 in the direction indicated even though switch 370 operates by the stack of bundles of laths in the elevator moving away therefrom to open its then closed contacts 393, 394 and close its contacts 368, 369. The stop push button switch 396 which can be used to stop the operation of the elevator motor at any time is located at the operator's station.

Operation of the elevator motor 110 continues in the direction indicated in the manner indicated until a switch 410 is closed by the engagement of an actuator thereon by the idle load bar at the right-hand side of the apparatus as viewed in Fig. 3, which load bar has by this time reached a position at or adjacent to the upper sprocket wheel. The actuation of switch 410 establishes a circuit from the line 177 through its now closed contacts 411, 412, wire 413 and time delay relay 414 to line 190. Operation of the time delay relay 414 closes closes its normally open contacts 415, 416 which establishes a holding circuit from the line 177 through the now closed contacts 415, 416 of time delay relay 414, wire 378 and operating solenoid 380 of motor controller 381 which continues the operation of the elevator motor 110 for a predetermined period, as the contacts 415, 416 of the time delay relay 414 are of the delay-open type. This time interval is such that when the contacts 415, 416 open and in turn stop the elevator motor 110, the load bar is in position to receive bundles of laths from the horizontal conveyor E.

When the stack of bundles of laths in the elevator or vertical conveyor G reached the bottom of the conveyor and were transferred by continued movement of the load bars to the horizontal conveyor H, they engaged and operated the switch 406 to open its normally closed contacts 404, 405, breaking the holding circuit for the relay 380, and to close its normally open contacts 420, 421. The closing of the normally open contacts 420, 421 of the switch 406 establishes a circuit from the line 177 through the switch 406, wire 422, and operating solenoid 424 of motor controller 425 to line 190, closing the normally open contacts 426, 427 and 428, 429 and 430, 431 connecting the motor 125 to the power lines 177, 190, 220 in such a manner that the motor operates to drive the conveyor J in a direction to remove the stack of bundles of laths thereon out of the vertical conveyor or elevator and onto the conveyor K. The motor controller 425 has a fourth normally open pair of contacts 432, 433 which contacts close upon energization of the solenoid 424 to again start the timer 277. The motor 125 can be operated at any time by a push button switch 434 at the operator's position to close its normally open contacts 435, 436, which contacts are in parallel circuit with the contacts 420, 421 of switch 406 between the line 177 and the wire 422.

The control for the motor 45 which drives the rolls 20, 21 is not shown, but it is of conventional construction and is started and stopped by a start and stop push button switch 435 located at the operator's station.

From the foregoing description of the preferred embodiment of the invention, it will be apparent that the objects heretofore enumerated have been accomplished and that there has been provided an improved apparatus for handling rigid articles, and more particularly, for stacking bundles of plaster boards.

While the preferred embodiment of the preferred invention has been described in considerable detail, it will be apparent that the invention is not limited to the particular construction shown, and it is hereby intended to cover all adaptations, modifications, and uses thereof which come within the practice of those skilled in the art to which the invention relates and the scope of the appended claim.

Having thus described the invention, what is claimed is:

In an apparatus of the character described for stacking a plurality of rectangularly shaped rigid articles fed thereto successively into a plurality of tiers positioned side-by-side connected together by frangible material interposed between one or more layers of such articles, horizontal conveyor means for receiving in side-by-side relation a plurality of rigid rectangularly shaped articles fed thereto and support such articles by engaging underneath opposite ends thereof, means for supporting said horizontal conveyor means for movement into and out of the position in which it engages underneath opposite ends of the articles fed thereto, first power operated means operatively connected to said horizontal conveyor means for moving said horizontal conveyor means out of and into said position, second power operated means adjacent to said horizontal conveyor means for feeding rigid rectangular shaped articles to said horizontal conveyor means to provide a layer of such articles thereon arranged in side-by-side relation, vertical conveyor means located underneath said horizontal conveyor means for receiving layers of articles fed thereto from said horizontal conveyor means and support the first such layer of articles fed thereto by engaging underneath opposite ends of the articles, third power operated means operatively connected to said vertical conveyor means for moving the same vertically, means for actuating said power operated means in timed relation to one another to feed articles to said horizontal conveyor means to form successive layers of articles thereon and to move said horizontal conveyor means out of and into said position in which it engages underneath opposite ends of the articles thereon upon the provision of a layer of articles thereon and to lower said vertical conveyor means subsequent to the transfer of a layer of articles thereto from said horizontal conveyor means, and means for providing a piece of frangible material on top of predetermined layers of articles prior to the positioning of a succeeding layer of articles on top thereof whereby there is formed in said vertical conveyor a plurality of side-by-side tiers of rectangularly shaped rigid articles having frangible material interposed between one or more layers of the articles.

No references cited.